Jan. 6, 1925.

W. A. CHRYST ET AL 1,521,598

IGNITION SYSTEM

Filed Dec. 22, 1917     6 Sheets-Sheet 1

Witnesses

Inventors
William A. Chryst
John H. Hunt
By Kerr, Page, Cooper and Hayward
Attorneys Jan. 6, 1925.

W. A. CHRYST ET AL 1,521,598

IGNITION SYSTEM

Filed Dec. 22, 1917

W. A. CHRYST ET AL 1,521,598

IGNITION SYSTEM

Filed Dec. 22, 1917 6 Sheets-Sheet 3

Jan. 6, 1925.

W. A. CHRYST ET AL 1,521,598

IGNITION SYSTEM

Filed Dec. 22, 1917 6 Sheets-Sheet 4

Patented Jan. 6, 1925.

1,521,598

UNITED STATES PATENT OFFICE.

WILLIAM A. CHRYST AND JOHN H. HUNT, OF DAYTON, OHIO, ASSIGNORS TO THE DAYTON ENGINEERING LABORATORIES COMPANY, A CORPORATION OF OHIO.

IGNITION SYSTEM.

Application filed December 22, 1917. Serial No. 208,369.

*To all whom it may concern:*

Be it known that we, WILLIAM A. CHRYST and JOHN H. HUNT, citizens of the United States of America, residing at Dayton, county of Montgomery, and State of Ohio, have invented certain new and useful Improvements in Ignition Systems, of which the following is a full, clear, and exact description.

This invention relates to ignition equipment for multi-cylinder engines, and, more particularly, for engines used in aviation work where maximum efficiency, lightness of weight and compactness of arrangement are required. Among the objects of invention, the following are enumerated.

To provide an ignition system for an internal-combustion engine having a non-symmetrical firing order which will provide sparks of equal intensity notwithstanding that the intervals between explosions are not all equal.

To provide an ignition unit which is adapted to receive current from a desired source; and in which are contained devices for supplying equal ignition to an engine having a non-symmetrical firing order; and in which are contained devices for preventing ignition upon a reversal of the engine.

To provide an improved ignition unit which is exceedingly simple and compact in design, light in weight, and reliable in operation; and one wherein the various parts are readily accessible for repairs or adjustments.

To provide an engine controlled ignition unit adapted for ready connection with the engine, the base of the unit serving as a cover for a casing inclosing a part of the engine gearing, so that practically no weight is added to the motor by the mounting of the unit thereon.

To provide an ignition system comprising a plurality of ignition units each of which can supply ignition for the entire engine, and which may operate separately or simultaneously; the system comprising also a plurality of sources of current and provisions controlling the delivery of current therefrom to the ignition units.

Further objects and advantages of the present invention will be apparent from the following description, reference being had to the accompanying drawings, wherein preferred embodiments of the present invention are clearly shown.

Figure 14:
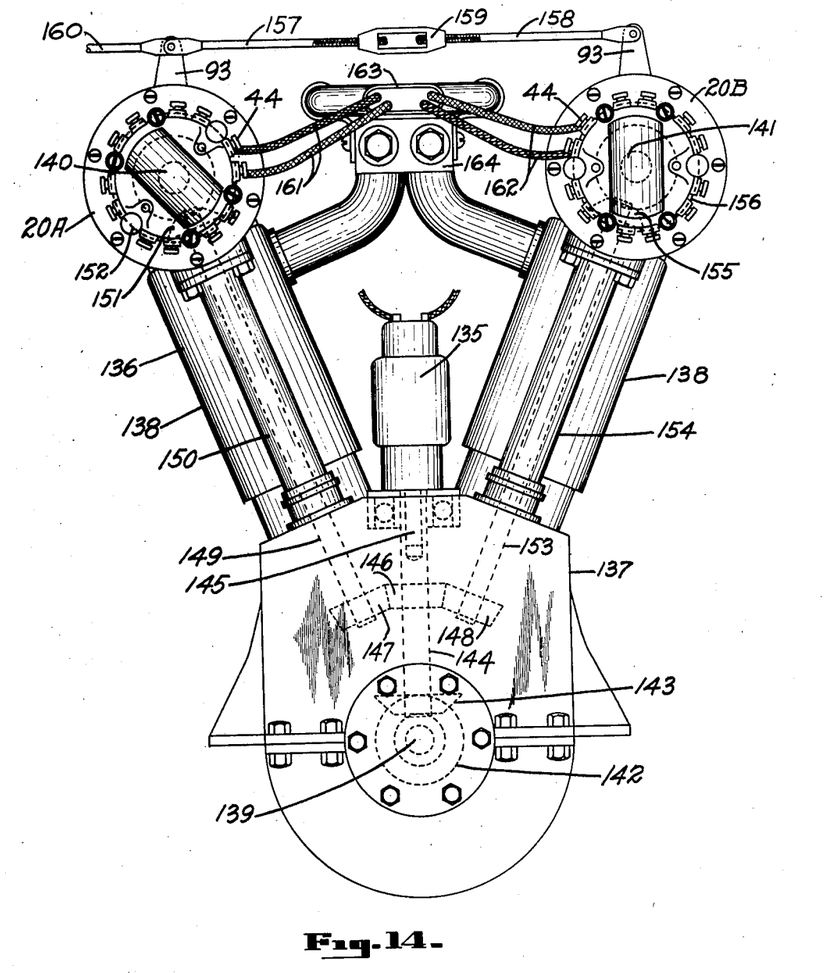
Fig. 14 is an end view of a V-type engine having overhead cam shafts enclosed in housings upon the ends of which are mounted ignition units embodying the present invention.

One of the ignition units will first be described: Referring to the drawings, 20 designates the unit having a circular base 21, provided with an annular boss 22 and a flange 23, adapted to secure the unit in place upon the cam shaft gear housing of an engine, as shown in Fig. 14. Fig 14 shows a multiple cylinder V-type engine having cam shafts placed above the cylinder heads. The usual end cover for the cam shaft gear housing is replaced by the base 21, which is centrally apertured to provide a bearing 22ª for a rotatable sleeve 23ª which forms an extension of the timer cup 24 or timer supporting element. The sleeve 23ª is provided with bearings 25 for a central shaft 26 carrying at its upper end the timer cam 27 and the distributor rotor 28. The end of the shaft 26 nearest the engine is provided with a leaf-spring connection 29 and a locating pin 30 for connecting the shaft with the engine cam shaft.

The cam 27 is provided with an annular channel 31 for the reception of felt or other oil absorbing material 32 and held in place by means of an annular retaining ring 33. The upper wall of the cam is apertured at 34[a] and the cylindrical walls are apertured at 35. Oil is introduced at 34[a] and is absorbed by the felt. Upon rotation of the cam, oil will be withdrawn from the felt by centrifugal force and pass out through holes 35 to the outer surface of the cam for purpose of lubrication. Thus a further object of this invention has been accomplished, namely, the provision of a self-lubricating cam in which may be stored a quantity of oil to be conducted as needed to the outer surface of the cam, to prevent undue wear and reduce friction between the camming surface and the cam followers. The weight of the cam is reduced to a minimum consistent with strength and rigidity by virtue of the hollow construction.

The rotor comprises an arm 34 of insulating material mounted upon the cam 27, and held in proper relation therewith by means of lugs 35[a] projecting into non-diametrically opposed recesses 36, formed in the upper surface of the cam. Since lugs 35[a] and recesses 36 are not diametrically opposite, whenever the rotor is placed upon the cam with said lugs seated in said recesses, it is certain that the rotor will be correctly located with respect to the cam. Both the rotor and cam are held in place upon the shaft 26 by means of a screw 36[a], the cam being broached as at 37 for the securing thereof upon the shaft 26 in fixed relation. The rotor carries a spring 38 which engages a metallic sleeve 39, in which slides a spring pressed plunger 40 made of conducting material. The weight of the rotor has been reduced by recessing the hub. A metal disc 28[a], about which the insulating material composing the rotor is cast, serves as an element which can be machined to close limits and, seated upon the accurately machined upper surface of the cam and serving as a seat for the screw 36[a], disc 28[a] will maintain the rotor in correct alinement with the distributor track to be described. The rotor is provided with a passage 134 leading to hole 34 in the cam, whereby oil may be introduced into the cam without first removing the rotor.

The distributor head 41 is constructed of insulating material, such as bakelite, which has been moulded around a vulcanized rubber ring 42 which serves as the distributor track. Metallic stationary contact elements 43 extend through the side walls of the head and terminate flush with the surface of the track. Members 43 are threaded to receive binding nuts 44 for the purpose of attaching the leads which conduct current from the stationary contacts to the various spark plugs of the motor. The upper portion of the head is provided with an interior chamber 45 for the reception of an induction coil 46 which will be described later. The head is held in place upon the timer cup by means of bolts 47, insulated from the cup by means of bushings 48 and washers 49, and provided at their lower extremities with nuts 50. The tightening up of nuts 50 will draw the enlarged portions 51 of the bolts down upon bushings 48. The upper portions of the bolts extend through the head and are threaded to receive thumb nuts 52 of insulating material. Springs 53 are interposed between a shoulder formed on nuts 52 and the upper surface of the head, and serve to transmit a yielding pressure from the nuts to maintain the head in place on the timer cup.

These bolts 47 serve as electrical conductors, one of them being connected by means of a conductor 54 with a source of current which it transmits to a metallic strip 55, the other bolt 47 is electrically connected at its upper end with strip 56, and at the enlarged portion 51 with a strip 57, which in turn is connected with a connecting plate 58 mounted upon the bottom of the timer cup, but insulated therefrom.

Upon the bottom of the timer cup is mounted a breaker arm bracket 59, by means of pins 60, 61 and 62, extending through the bracket, timer cup, and base; and by means of a stud 63 mounted in the timer cup and having its upper end threaded to receive a nut 64. The pin 60 extends through a round hole in the bracket and serves as a pivot about which the bracket may be swung for adjustment, which will be described later, slotted apertures being formed in the bracket for the reception of the pins 61 and 62, and for the stud 63.

It will be seen that by loosening the nut 64, that the bracket 59 may be swung about the pin 60 to a desired position and may be secured by tightening the nut 64. The breaker arm bracket 59 carries breaker arms 65, 66, and 67, mounted upon posts 68 secured to the bracket, but insulated therefrom by means of non-conducting bushings 69. The arms 65, 66, and 67 are provided with contacts 70, 71, 72 respectively, which engage with stationary contacts 73, 74, and 75, respectively, which are adjustably mounted upon up-turned ears 76, formed integral with the bracket 59. Springs 77, 78, and 79 are electrically connected at one end with the member 58, and at other portions thereof with the arms 65, 66, and 67, respectively. The springs serve to keep the stationary and movable contacts in touching relation, except at such times when the cam cooperating with the fiber followers 80, 81, and 82 will cause the pairs of contacts to separate. Rubber cushions 83 are interposed between the ends of springs 77 and 78, and their respective arms, and serve to transmit the spring pressure to maintain the contacts in engagement. The rubber cushions 83 serve to absorb the shock, due to the sudden impact of the contacts when the cam permits the arm to swing back, and thus prevent rebound or chattering when revolving at high speeds. This feature, however, forms no part of the present invention, but is fully described and claimed in the copending application of J. H. Hunt, Serial No. 209,845 filed January 2, 1918. A resistance coil 84, supported upon a spool 85 of non-conducting material, is interposed between the spring 79 and connecting plate 58, the purpose of which will be described later. The breaker arm bracket 59 is provided with an up-turned projection 86, upon which is mounted a condenser casing 87 containing a condenser of well known construction shown diagrammatically in Fig. 12 at 88. One terminal of the condenser is connected with the connecting plate 58 by a wire 89, and the other terminal is grounded upon the bracket 59 (see Fig. 12).

Figure 1:
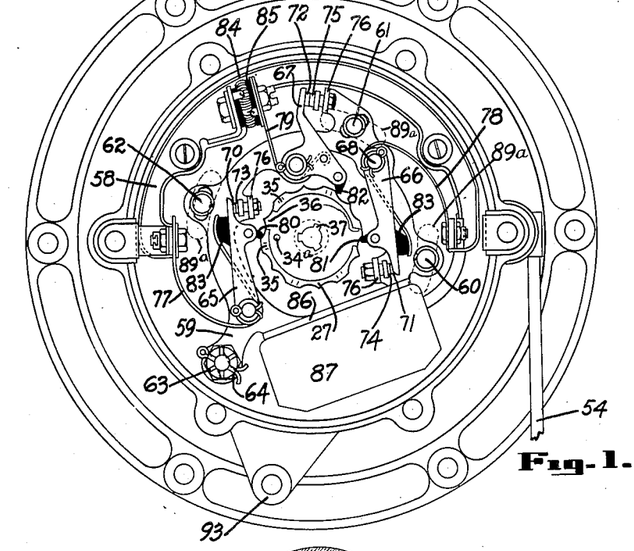
Fig. 1 is a plan view of the ignition unit, the distributor head and rotor being removed.
Figure 2:
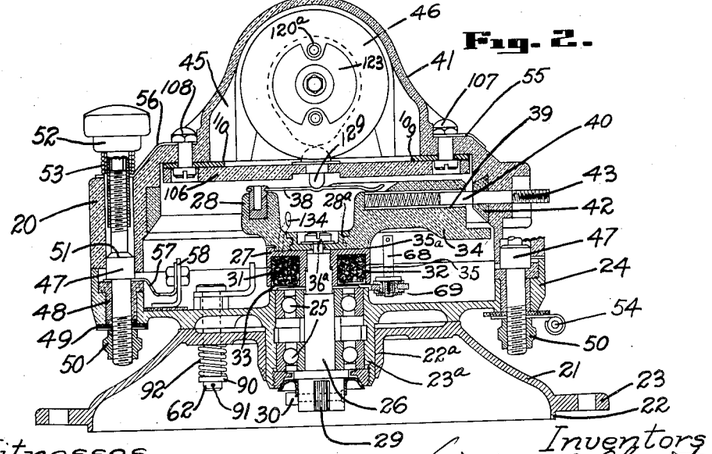
Fig. 2 is a view showing a vertical cross-section of the distributor.
Figure 3:
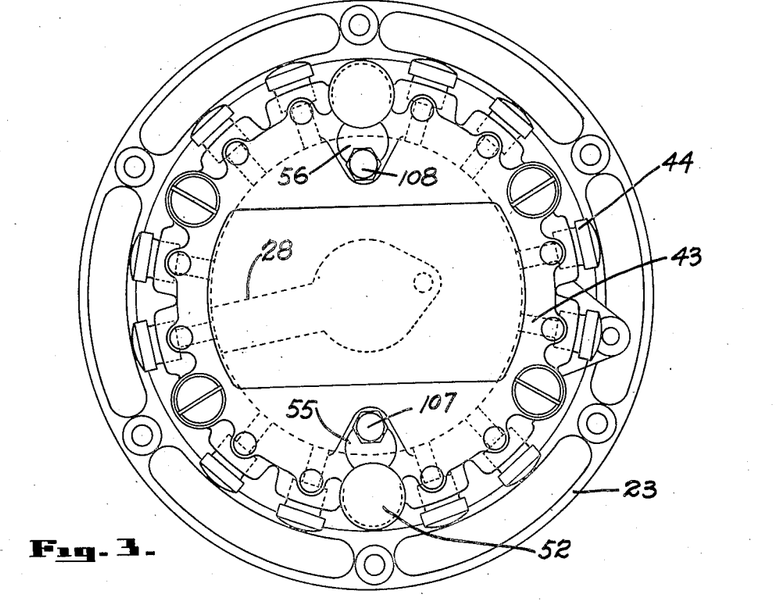
Fig. 3 is a plan view of the unit.
Figure 4:
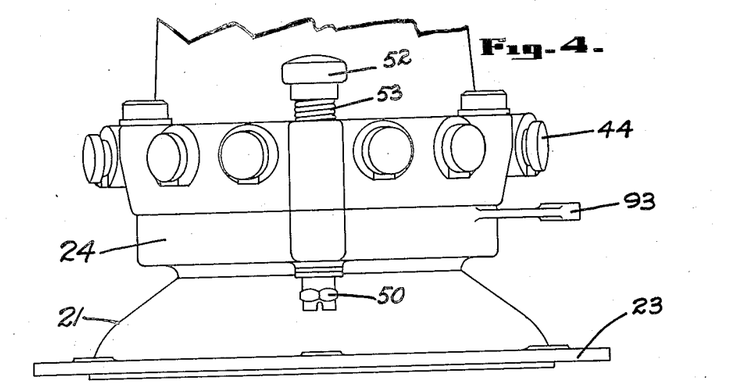
Fig. 4 is a fragmentary side view of the unit.
Figure 5:
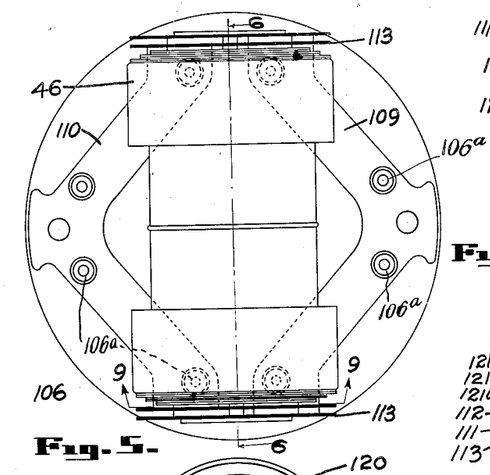
Fig. 5 is a plan view of the induction coil attached to its mounting.

The pins 60, 61, and 62, extend through curved slots 89$^a$ in the upper wall of the base. These pins are provided at their lower ends with washers 90 and held in place with cotter pins 91. Springs 92 are interposed between the upper surfaces of the washers and the inside of the top wall of the base. The purpose of these springs and slots 89$^a$ is to permit an adjustment of the timer cup on the base to regulate the time of the spark and to hold the timer cup 24 in adjusted position. The timer cup is provided with an outwardly extending arm 93 (see Figs. 1 and 4), to which may be attached any suitable device within easy reach of the operator which will transmit motion to the timer cup for the purpose of revolving the contact arms carrying the movable contacts, and the stationary primary contacts about the timer cam; and revolving the distributor stationary contacts carried by the head about the distributor rotor, for the purpose of obtaining an advance or retard in the timing of the spark in a manner well known in the art.

Figure 13:
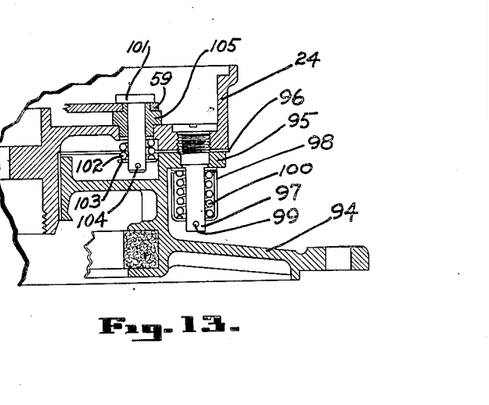
Fig. 13 is a fragmentary section of the distributor, as shown in Fig. 2, but with slight modifications.

In Fig. 13 is shown a slight modification of the construction just described. The base 94 in this construction is provided with an outwardly extending annular flange 95. The bottom surface of the timer cup 24 rests upon a copper gasket 96 interposed between the cup 24 and flange 95, for the purpose of securing a more perfect electrical connection. Pins 97 are fixed at their upper ends in the cup 24 and extend through slots formed in the flange 95, similar to the slots 89 already described. The lower ends of pins 97 are provided with spring retaining cups 98, held in place by cotter pins 99; and springs 100 are interposed between the flange and bottom of the retaining cup, and serve the same purpose as springs 92 described. Separate pins 101 cooperating with springs 102 interposed between the bottom of the timer cup and washers 103, held in place by means of cotter pins 104, serve to hold the breaker arm bracket 59 in place upon shouldered washers 105 carried by the timer cup.

Figure 6:
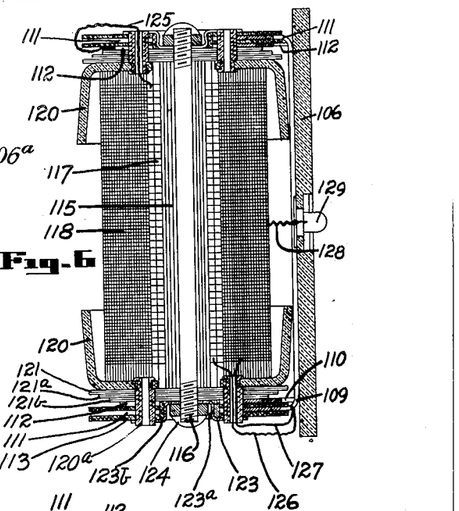
Fig. 6 is a sectional view taken on the line 6—6 of Fig. 5.
Figures 7, 8, 9:
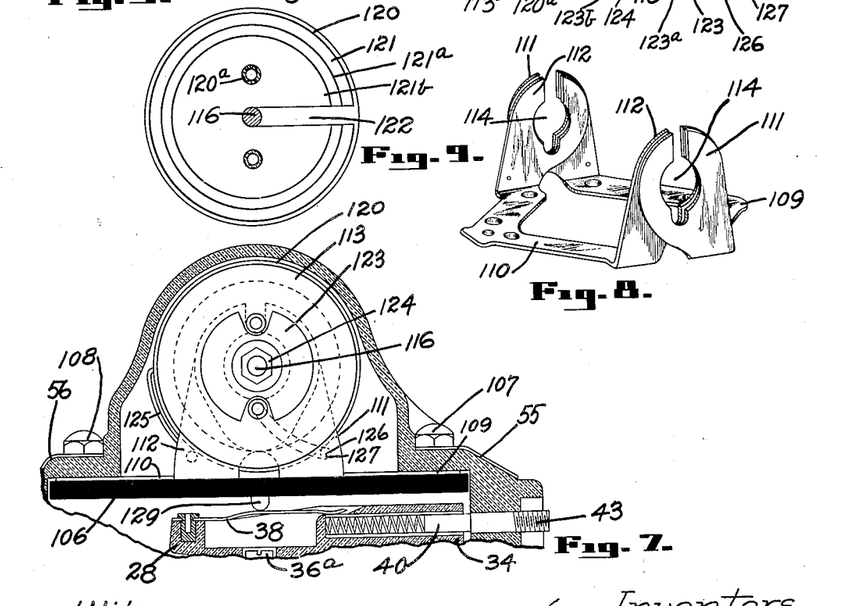
Fig. 7 is an end view of the induction coil, the distributor head and related parts being shown in section.
Fig. 8 is a perspective view of the brackets supporting the induction coil.
Fig. 9 is a sectional view on line 9—9 of Fig. 5.

The induction coil will now be described. A base of non-conducting material 106, is seated in a circular recess formed in the distributor head above the track 42 and secured to the lower face of the coil brackets 109 and 110 by rivets 106$^a$ or other suitable means and the coil brackets are secured to the distributor head by bolts 107 and 108 which pass through and make electrical connection with the coil brackets 109 and 110, and with the strips 55 and 56 respectively. Bracket 109 is provided with the up-turned ends 111, and bracket 110 with up-turned ends 112. It will be seen upon reference to Fig. 8 that bracket 110 is shorter than bracket 109, so that the ends 112 may be placed opposite ends 111, with spaces therebetween for the reception of insulation discs 113 (see Fig. 6). The ends 111 and 112 are provided with recesses 114 for the reception of the coil which will now be described.

The coil includes a laminated core 115 surrounding the bolt 116. Upon the core are mounted primary windings 117, indicated by large squares, and the secondary windings 118, indicated by the small squares in Fig. 6. The ends of the coil are provided with insulating caps 120, carrying bushings 120$^a$, and outside of these caps are placed three pairs of laminated discs 121, 121$^a$, and 121$^b$ provided with holes for the reception of the bushings. The purpose of these discs is to confine the magnetic field to the coil windings as much as possible. Each disc is provided with a notch 122 extending from the periphery to the center to prevent formation of eddy currents, and to permit of the passage of bolt 116. Since it is highly desirable in aviation work where this distributor is adapted to be used, to keep down the weight so far as possible, it has been found that the discs more distant from the ends of the laminated core may be less in diameter than those discs which are nearer, without any loss in efficiency in the provision against losses in the magnetic field. Insulation discs 113, centrally apertured for the reception of an insulation ring 123ᵇ which holds the insulating plates 113 in coaxial positions, are centrally located with respect to the coil by means of bushings 120ᵃ which pass through diametrically opposite holes in said discs after the discs 113 have been placed on the bushings with spaces between them and the laminated discs 121ᵇ, for the introduction of bracket ends 111 and 112. The brackets 109 and 110 having been assembled on the base 106, the coil thus far assembled is lowered into position on the brackets, the bracket ends 112 being inserted in the space between discs 121ᵇ and the adjacent insulation discs 113, and ends 111 being inserted in the spaces between the discs 113. Bushings 120ᵃ slide into vertical extensions of the recesses 114 in the bracket ends and locate the coil in proper position with respect to the brackets with bolt 116 located centrally of recesses 114. This operation being completed, end plates 123 having cup-shaped portions 123ᵃ around which are placed insulation rings 123ᵇ, are placed one on each end of bolt 116, and are pushed in toward the ends of the coil. the portions 123ᵃ with surrounding spaces 123ᵇ seating in the recesses 114 of the brackets. The end plates 123 have flange portions which engage upon the outer discs 113. The entire structure is clamped together by means of nuts 124 cooperating with bolt 116.

One end of the primary winding is connected by a wire 125 to bracket 110. The other end of the primary winding 126 and one end of the secondary winding 127 are connected to the bracket 109. The other end of the secondary winding 128 is connected to a metallic button 129 mounted upon the center of the base 106. Button 129 is axially aligned with shaft 26 and bears at all times upon the spring 38 carried by the distributor rotor 28.

Figure 12:
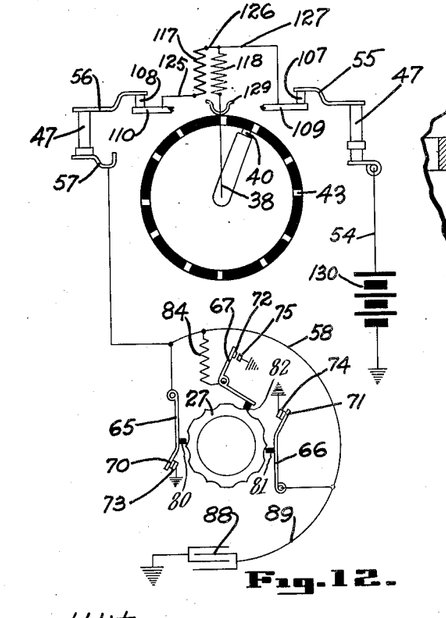
Fig. 12 is a wiring diagram of one of the ignition units with a single source of current.

The circuits through the ignition unit are shown diagrammatically in Fig. 12, with a single source of current supply. The current from the battery 130, grounded on the motor base, passes through connections 47, 55, 107, 109, 127, and 126, through the primary winding 117, and other connections 125, 110, 108, 56, 47, and 57, to the connecting plate 58, from which are taken four parallel circuits. One circuit is formed through the breaker arm 65, contacts 70 and 73, to the distributor base which forms a ground connection on the engine; a second circuit is through resistance 84, breaker arm 67, contacts 72 and 75, to ground; a third circuit is through breaker arm 66, contacts 71 and 74, to ground; and the fourth circuit is through wire 89, condenser 88, to ground.

One end of the secondary circuit 118 is grounded through the battery or through the timer, and a path for the secondary current is formed through button 129, spring 38, rotor contact 40, one of the stationary contacts 43 leading to one of the engine spark plugs (not shown), the other terminal of which is grounded.

From the foregoing description, it is apparent that there has been provided an ignition unit in which the weight of the parts has been reduced to a minimum consistent with strength and stability. The cam shaft gear housing of the engine being replaced by the base of the ignition unit, very little weight is added by the attachment of the unit. The arrangement of the parts contained in the unit is very compact, yet conducive to convenience in assembling. Some of the mechanical connections between the parts serve as conductors, and in the assembling together of the main parts of the unit, namely, the base, timer cup, and distributor head, there are no wires or "pigtails" to be connected. Since the unit and the source of current are grounded on the engine, as will be fully shown later, there is only one external low tension wire attached to each unit. The only other external conductors are the leads from the distributor to the spark plug terminals, which are necessarily present in any ignition system.

Figure 10:
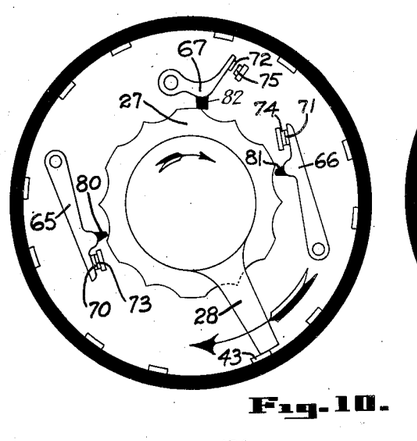
Figs. 10 and 11 are diagrammatic plan views of the timer and distributor rotor of one of the units, showing relative positions during normal and reverse rotations respectively of the engine.
Figure 11:
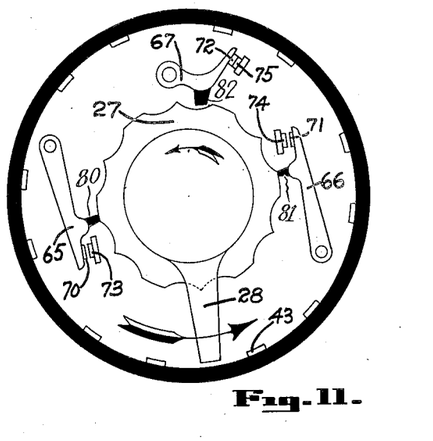

Attention is now directed to Figs. 10 and 11. The arrows in Fig. 10 indicate the direction of rotation of the cam and distributor rotor when the engine crank shaft is rotating in the normal direction. The arrows in Fig. 11 indicate the direction of rotation of these elements upon a reversal of the engine. Fig. 10 shows the relative position of the cam and cam followers just before the cam touches followers 80 and 81, and after engaging follower 82. It will be noted that upon rotation of the cam in the normal direction, contacts 72 and 75 will separate before contacts 70, 73, and contacts 74 and 71. Contacts 70, 73, and 74 and 71, are so located with respect to the cam that separation is effected simultaneously. Adjustment to bring about this simultaneous separation is effected by means of the adjustable breaker arm bracket previously described. It will be seen that by rotating the bracket 59 about pin 60, that the edges of cam followers 80 and 81 may be brought diametrically opposite to one another, so that both followers will be engaged by the cam lobes at the same time. This adjustment of followers 80 and 81 will not materially affect the relation of follower 82 to the cam, for the reason that follower 82 moves through a short arc substantially radially of the cam 27, the adjustment being so small as not to affect appreciably the relative positions of the cam followers 80 and 81, and 82 to the cam. Hereafter breaker arms 65 and 66 with their parts cooperating therewith, will be known as main circuit breakers. The breaker arm 67 with its cooperating parts will be known as the resistance circuit breaker since resistance 84 is included between the breaker arm and the connecting plate 58. Two main circuit breakers are used so that in case of faulty adjustment of the breaker contacts, two chances are available of obtaining perfect contact during the period of closing of the primary circuit.

Upon reference to Fig. 11, it will be noted that upon a reversal of rotation of the cam, the main circuit breakers open before the resistance circuit breaker opens. Referring again to Fig. 10, it will be noted that just as the main circuit breakers open, the distributor rotor will be in contact with one of the stationary contacts 43, while, referring to Fig. 11, it will be seen that upon a reversal of the engine, the resistance circuit breaker will be closed at the time in which the main circuit breakers are open, with the result that all of the primary current must now pass through the resistance 84. When these conditions are present, the current in the primary will not only be greatly reduced, but the intensity of the magnetic field surrounding the induction windings will be partially reduced and at a rate slow enough to prevent sparking at the plugs. As an extra precaution against sparking upon a reversal of the engine, the distributor rotor is so arranged with relation to the cam that at the time when the much enfeebled sparking impulse is induced in the secondary, the rotor will not be in contact with any one of the stationary contacts 43, but there will be a gap between these elements as shown in Fig. 11.

When the circuit is finally broken, upon the separation of the contacts of the resistance circuit breaker, the current in the primary has reached so low a value that there is not sufficient energy to produce appreciable sparking at the engine plug, the presence of the resistance 84 in the condenser circuit helping to inhibit sparking. Apparatus embodying this invention has been successfully operated to entirely eliminate sparking at the plugs upon reversal of the engine. Thus a double protection against back firing of the engine upon a reversal of rotation is afforded. The timer is rendered ineffective to break the primary circuit in such a manner as to induce a current in the secondary of sufficient strength to cause ignition of a combustible mixture in the engine cylinders, and the distributor is rendered ineffective to distribute even the much weakened sparking impulse which may be created upon reversal of the engine. Therefore the possibility of serious accidents and of damage to the engine attendant upon back firing, often occurring when the engine is started by rocking the propeller against compression, has been eliminated in a thoroughly reliable manner.

The foregoing description, relating to the nonsparking upon reversal of operation of the timer cam, has been fully described, claimed and illustrated in the co-pending application of John H. Hunt, Serial No. 209,844, filed January 2, 1918, and the present description is included herein in order to more fully describe the complete ignition system.

It will be noted that the lobes of cam 27 are alternately wide and narrow. The particular unit herein disclosed is adapted for use with an engine having a non-symmetrical firing order, for instance, a twelve cylinder engine having two rows of six cylinders in diverging V relation, in which the angle between the V is 45 degrees. In such an engine the firing order is 75 degrees and 45 degrees alternately, having reference to the crank shaft. Referring to the engine cam shaft to which the timer cam shaft is directly connected, the firing order is $37\frac{1}{2}$ degrees and $22\frac{1}{2}$ degrees alternately. The cam therefor is cut so that the spaces between the beginnings of the lobes are $37\frac{1}{2}$ degrees and $22\frac{1}{2}$ degrees alternately. By the term, "beginning of the lobe" is meant the point at which the lobe first engages the cam follower to effect separation of the contacts. The "end of the lobe" is the point where the follower leaves the cam when the contacts have come together. By this construction the creation of the sparking impulses will occur in proper sequence, and since the stationary contacts of the distributor are spaced $37\frac{1}{2}$ degrees and $22\frac{1}{2}$ degrees, alternately, distribution of these impulses to the various spark plugs will take place at the proper time. If the cam lobes were all of the same length, the breakers would remain closed unequal lengths of times alternately, hence the flux through the induction coil would not be built up to the same value at the occurrence of each successive break and unequal ignition would result. To provide uniform ignition under these conditions, the wells between the end of any lobe to the beginning of the next succeeding lobe must all be equal, so that the contacts will remain closed equal lengths of time, and that the flux through the induction coil may be built up to the same value before each successive break. In order to make these wells equal alternate lobes are made broad.

It is to be noted that this feature of the cam does not hinder the operation of the resistance circuit breaker, by virtue of its relation to the main circuit breakers.

It is apparent therefore that the present invention contemplates providing non-symmetrical ignition by producing at non-symmetrical intervals in the region of an inductive circuit, the secondary winding 118, a series of changes in magnetism which are substantially equal in value. These changes are preferably produced electromagnetically by means of the primary winding 117 upon which is impressed an electromotive force to produce the passage of current therein during equal but non-symmetrically occurring intervals. It will be understood that the terms "non-symmetrical intervals" or "asymmetrical intervals" as used in the specifications and claims, mean a recurring cycle of unequal intervals.

From the foregoing description, it is apparent that an ignition unit has been invented which possesses the additional advantage of providing uniform ignition for engines having non-symmetrical firing order.

Fig. 14 shows an end view of a multi-cylinder engine 136, which is of the V-type, consisting of a crank case 137 upon which are mounted rows of cylinders 138 having their axes arranged at an angle of 45 degrees. 139 designates the crank shaft, and 140 and 141 dessignates the cam shafts, the overhead cam shafts for operating the valves (not shown), controlling the inlet and exhaust ports of the cylinders. The cam shafts are driven from the crank shaft 139, by means of a gear 142 connected to the crank shaft which drives the gear 143, mounted on a vertical shaft 144, which carries a gear 146. Gear 146 meshes with gears 147 and 148, mounted on shafts 149 and 153 respectively, which are supported by pedestals 150 and 154 respectively. Shafts 149 and 153, carry at their upper ends gears 151 and 155, which mesh with gears 152 and 156 mounted upon the cam shafts 140 and 141 respectively. The relative size of the gears just described is such that the cam shafts will rotate at one-half engine speed. Cam shafts 140 and 141 and the gearing cooperating therewith are inclosed in housings (not shown). Upon the ends of these housings are mounted ignitions units 20$^A$ and 20$^B$, the bases of which serve as covers for the housings. The act of mounting the ignition units upon the cam shaft housings accomplishes the connection of the timer cam shafts 26 with cam shafts 140 and 141, and also accomplishes the making of an electrical connection between the ignition unit and the engine frame, upon which the source of ignition current supply is grounded. The timer cup arms 93 are connected together by means of rods 157 and 158, having threaded engagement with an intermediate turnbuckle 159. The rod 160 connected with the arm 93 of unit 20$^A$, is operably associated with any controlling lever within easy reach of the operator, by means of which the timer cups may be shifted about their respective axes, to effect advance or retard of the ignition. By adjusting the distance between the points of connection of rods 157 and 158 with arms 93 by means of turnbuckle 159, the time relation of the two units may be synchronized. While for the sake of clearness, but two high-tension leads 161 and 162 are shown leading out of units 20$^A$ and 20$^B$ respectively, into a conduit 163, from whence these leads branch off at various points to connect up with the proper spark plugs, it is to be understood that each ignition unit is connected with all of the spark plugs of the engine. As a convenient support for the high-tension lead conduit 163, the intake manifold 164 is employed. A generator 135 for supplying current for the ignition, is mounted upon the engine in the vertical fashion, having its armature shaft 145 operably connected with the shaft 144.

Figure 15:
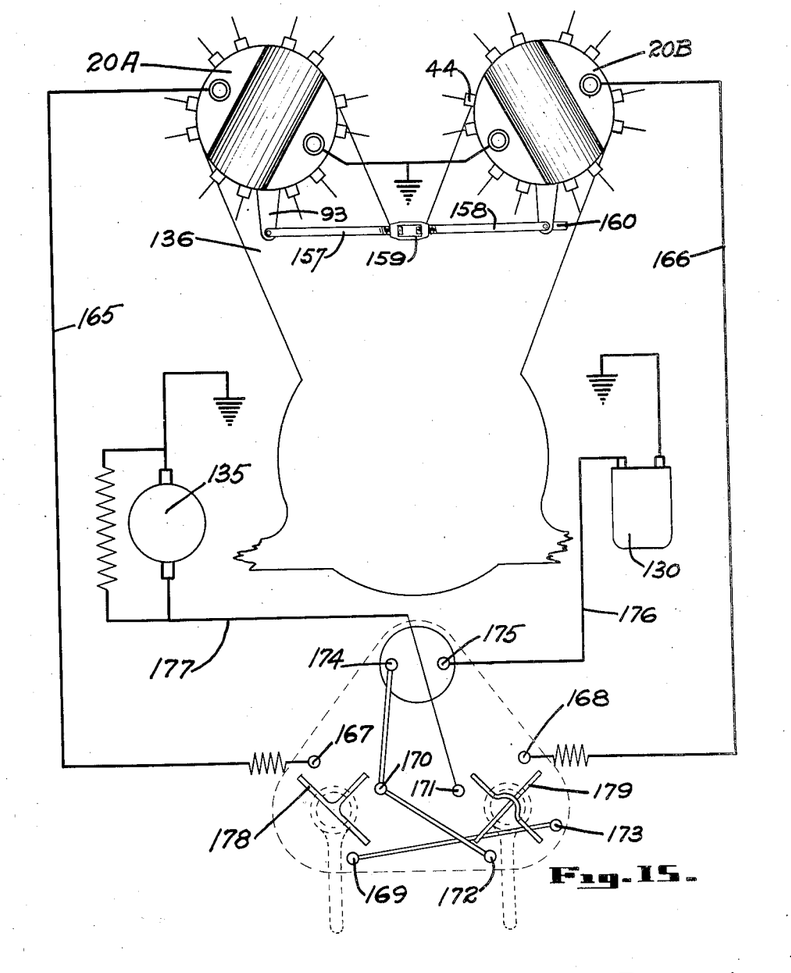
Fig. 15 is a diagrammatic end view of the engine and ignition units shown in Fig. 14, and a wiring diagram showing connections from two sources of current to a switch and thence to the ignition units.

Fig. 15 shows diagrammatically an ignition system for an engine, such as depicted in Fig. 14, comprising two ignition units and two sources of current and suitable connections, which provide for connecting either or both of the units with one of the sources, and both of the units with both of the sources. In the present embodiment, a storage battery 130, and generator 135 are employed for sources of current.

Switch 179 having insulated arms bridging contacts 171 and 173, and contacts 168 and 172, and switch 178 bridging contacts 167, 169, and 170, serve to control the circuits leading from the generator 135 and battery 130 to the units 20$^A$ and 20$^B$. The battery circuit is as follows: From the battery 130, grounded on the engine, through 176, across ammeter terminals 175 and 174, dividing at 170 between terminals 167 and 172; from 172 to 168, through 166 to unit 20$^B$ to ground; and from 167 through 165 to unit 20$^A$ to ground. The circuit from the generator, grounded on the engine, leads through 177 to 171, across to 173 to 169, dividing through switch 178 between 167 and 170. From 167 current passes to the unit 20$^A$, and from 170 to 172 across to 168 and thence to the unit 20$^B$. In case the battery needs charging, some of the generator current flowing at 170 will pass back through the ammeter and to the battery 130.

Ignition for engine starting purposes may be supplied by either one or both of the ignition units 20$^A$ and 20$^B$ operating in connection with battery 130. Preferably starting ignition current is supplied to only one of the units in order to conserve the current stored in the battery. The operator moves either one of the switches 178 and 179 to closed or "on" position. If switch 178 be closed unit 20$^A$ will be connected with battery 130; or if switch 179 be closed, the battery will be connected with unit 20$^B$. After the engine has been started, the operator moves the unclosed switch to closed position, so that with both switches closed, both ignition units will be rendered operative and the generator will be connected with the battery. To operate the system properly, but one of the switches 178 and 179 should be closed on starting the engine, however, it is entirely immaterial which one be closed. Therefore the present invention provides a system of control which is exceedingly simple and entirely fool-proof. The operator need only remember to close one of the switches at starting and both of the switches after the engine becomes self-operative.

The foregoing describes an ignition system in which a plurality of ignition units are employed, each of which is controlled by the engine to which the units are mechanically connected, and each of which supplies complete ignition for all of the cylinders. The provision of such a system is very important in aviation work in general, and especially as applicable to military operations. If any of the units or any of the current sources should be disabled, other of the units and current sources would be available for supplying ignition.

While there has been shown but one condenser in the primary circuit of the ignition unit, it is understood to be within the province of this invention to provide a plurality of condensers in parallel, so that, if any of the condensers fail to operate, the remaining condensers will still be effective.

While the form of mechanism herein shown and described constitutes a preferred form of embodiment of the invention, it is to be understood that other forms might be adopted, all coming within the scope of the claims which follow.

What we claim is as follows:

1. In an ignition system, the combination with a primary winding and a secondary winding inductively related; of means for impressing electromotive force upon said primary winding during equal but non-symmetrically occurring intervals and for releasing said energy to induce in said secondary winding sparking impulses of equal intensity at non-symmetrical intervals.

2. In an ignition system, the combination with a primary winding and a secondary winding inductively related; of means for impressing electromotive force upon said primary winding during equal but non-symmetrically occurring intervals whereby to induce in said winding a series of sparking impulses of equal intensity; and means for distributing said sparking impulses from said secondary winding in non-symmetrical sequence.

3. In an ignition system, the combination of an induction coil, a source of direct current, a pair of contacts, and means including a cam having an irregular camming surface for producing sparking impulses of equal intensity at irregular intervals.

4. In an ignition system for internal combustion engines having non-symmetrical firing order, the combination with primary and secondary circuits; of a timing device comprising co-operating contacts in the primary circuit, mounted for movement, the one relatively to the other, and an engine driven cam having a camming surface which will cause the separation of the contacts in non-symmetrical succession, but which will permit the contacts to remain in touching relation for equal lengths of time; and a device for distributing in non-symmetrical order, the sparking impulses induced upon the separation of the contacts.

5. In a device of the character described, the combination with a distributor, comprising a timing and distributing device; of a base; a timer cup mounted for rotation upon the base; a distributor head carrying a distributor track mounted upon the timer cup and serving as a cover therefor; circuit breaking devices mounted upon the timer cup; a shaft; a timer cam and a distributor rotor mounted on the shaft and located within the space inclosed by the cup and head, the head provided with a chamber extending beyond the distributor track; a partition of non-conducting material located beyond the track and closing the chamber; and an induction coil mounted within the chamber and upon the partition.

6. In an ignition device, the combination with a timer cam shaft; of a timer cam mounted on said shaft; a distributor rotor mounted upon said cam, said cam and rotor having coacting provisions whereby the axis of said rotor is located in coincidence with and in fixed angular relation with respect to said cam; a distributor head; and means independent of said distributor head for securing said rotor in position upon said cam.

7. In an ignition device, the combination with a timer shaft; of a timer cam mounted on said shaft, said cam being provided with an annular flange on one of its plane surfaces, said flange being provided with notches; and a rotor provided with an annular recess arranged to cooperate with said annular flange on the cam whereby to locate the rotor concentrically with respect to the cam, said rotor being provided with lugs arranged to coact with the notches in said annular flange whereby to locate said rotor in fixed angular relation with said cam; a distributor head; and means independent of said distributor head for securing said rotor upon said cam.

8. In an ignition device, the combination with a timer cam having self-lubricating provisions including passages opening out upon the camming surface for the exit of lubricant and the passage entering through one of the plane surfaces of the cam, and a distributor rotor mounted upon said plane surface of the cam, said rotor being provided with an oil duct located in alinement with said oil passage in the plane surface of the cam, whereby when the rotor is in assembled position upon the cam, lubricant may be fed into said cam through said oil duct in the rotor.

9. In an ignition device, the combination with a distributor head including centrally disposed stationary contact and a plurality of stationary contacts arranged in a circular path; of a timer shaft; a distributor rotor mounted upon said shaft and provided with a centrally disposed recess; a brush carried by the rotor and arranged to cooperate with the distributor contacts; and a leaf spring attached to said rotor on one side of said recess and extending across said recess and arranged to contact with the centrally disposed distributor contact and with the rotor brush; and a screw passing through said rotor and having threaded engagement with said timer shaft, the head of said screw being located in said recess.

10. In an ignition system, the combination with a source of current; of an ignition device including a timer cup supporting an ignition timing device, a distributor head mounted upon said timer cup and supporting distributor contacts and an ignition coil, and means for attaching said head upon said timer cup, said means serving as part of the electrical connections between the current source, timer, and ignition coil.

11. In an ignition system, the combination with a source of current; of an ignition device including a timer cup supporting an ignition timing device, a distributor head mounted upon said timer cup and supporting distributor contacts and an ignition coil, bolts secured upon said timer cup and extending through portions of said distributor head and thumb nuts cooperating with said bolts whereby said distributor head may be screwed in position upon said timer cup, one of said bolts serving as part of the electrical connections between the current source and the ignition coil, and the other bolt serving as part of the electrical connection between the ignition coil and timer.

12. In an ignition device, the combination with a supporting base; of a timer cup mounted for rotation upon said base; a cam shaft journalled upon said timer cup; timer actuating elements carried by said cam shaft; and a distributor head mounted upon said timer cup.

13. In an ignition device, the combination with a timer cup; of ignition timing devices supported by said cup; a distributor head carrying a distributor track mounted upon said timer cup and serving as a cover therefor, said head being provided with a chamber extending beyond said distributor track; an engine driven shaft supporting ignition controlling devices within said cup and distributor head; and an ignition coil base supporting an ignition coil within said chamber, said coil base serving as a partition closing off said chamber from the enclosure formed by said timer cup and distributor head.

14. In an ignition system, the combination with a multicylinder internal-combustion engine having non-symmetrical firing order; of ignition means providing for the passage of ignition currents during equal but non-symmetrically occurring intervals whereby to provide a series of sparking impulses of equal intensity but in non-symmetrical sequence, and mechanically operated means for distributing said sparking impulses in non-symmetrical order.

15. In an ignition system, the combination with a multicylinder internal-combustion engine having non-symmetrical firing order; of a primary and a secondary circuit, a current source; a timer controlling the passage of ignition current through said primary circuit during equal, but non-symmetrically occurring intervals whereby to induce in said secondary circuit a series of sparking impulses of equal intensity but in non-symmetrical sequence, and mechanically operated means for distributing said sparking impulses in non-symmetrical order.

16. In an ignition system, the combination with a multicylinder internal-combustion engine having non-symmetrical firing order; of a primary and a secondary circuit; a current source; a timer including a pair of cooperating contacts connected with said primary circuit and current source, and including an engine driven member for permitting the closing of said contacts during equal but non-symmetrically occurring successive intervals; and means for distributing the sparking impulses induced upon the separation of said contacts.

17. In an ignition device, the combination with a timer supporting element and timing devices supported thereby; of a distributor head mounted upon said element, said head being provided with a circular row of contacts and with a chamber; a removable partition separating said chamber from said row of contacts, and having a contact centrally disposed with respect to said row of contacts; an ignition coil located in said chamber and connected with said central contact; and a rotor for distributing from said central contact to said row of contacts.

18. In an ignition distributor, the combination with an operating shaft and a support therefor; of a distributor head mounted upon said support, said head being provided with a circular row of contacts and with a chamber; a removable partition separating said chamber from said row of contacts, and having a contact centrally disposed with respect to said row of contacts; an ignition coil located in said chamber and connected with said central contact; and a rotor connected with said shaft for distributing from said central contact to said row of contacts.

19. In an ignition distributor, the combination with an operating shaft and a support therefor; of a distributor head mounted upon said support, said head being provided with a circular row of contacts and with an interior chamber; a contact centrally disposed with respect to said row of contacts; an ignition coil located in said chamber and connected with said central contact; a rotor connected with said shaft, for distributing from said central contact to said row of contacts; and means for supporting said central contact and said ignition coil, said means being detachably secured to said head.

20. In an ignition distributor, the combination with an operating shaft and a support therefor; of a distributor head mounted upon said support, said head being provided with a circular row of contacts and with an interior chamber disposed centrally with respect to said row of contacts; a contact centrally disposed with respect to said row of contacts and support by said head; an ignition coil located in said chamber and connected with said central contact; and a rotor connected with said shaft for distributing from said central contact to said row of contacts.

21. The combination with a generator, storage battery, and ignition apparatus, of a pair of individually operative switches, either of which is adapted to connect the battery with the ignition apparatus, and connections between the generator and one switch and between the switches whereby the generator and battery are connected in series with both switches when the latter are in operative positions.

22. The combination with a generator, storage battery, and ignition apparatus, of a pair of individually operative switches, either of which is adapted to connect the battery only with the ignition apparatus, and connections between the generator and one switch and between the switches whereby the generator and battery are connected when the switches are in operative positions.

23. In a V-type airplane engine, in combination, two cylinder blocks arranged at an angle to each other of less than the average angle between explosions, to reduce head resistance, so that the explosions occur at longer and shorter intervals alternately, a direct current ignition system including an induction coil arranged to deliver current to all the cylinders and in desired order, and means to cause said induction coil to evolve a spark of substantially the same intensity for each of the cylinders of both blocks.

24. In a V-type airplane engine, in combination, two cylinder blocks, arranged at an angle to each other of less than the average angle between explosions to reduce head resistance, so that the explosions occur at longer and shorter intervals alternately, a direct current ignition system including an induction coil arranged to deliver current to all the cylinders and in desired order and means to allow a period for building up of magnetic flux for the coil preparatory to spark which has the same value for the cylinders of both blocks.

25. In a V-type airplane engine, in combination, two cylinder blocks, arranged at an angle to each other of substantially one-half the average angle between explosions, a direct current ignition system including an interrupter cam, said cam having circuit closing conformations of uniform length, adjoining the circuit opening conformations.

26. In a V-type airplane engine, in combination, two cylinder blocks, a cam shaft for each block, a distributer driven by each cam shaft and a single source of current supply for both distributers.

27. In a V-type airplane engine, in combination, two cylinder blocks, overhead cam shafts, an ignition system including a current generator between said blocks, a plurality of synchronized timers, an equal number of induction coils, the primary of one adapted to be broken by each timer, and a plurality of distributers, one connected with the secondary of each induction coil, said distributers being mounted on said cam shafts.

28. In an internal combustion engine of a type in which the firing order proceeds at irregular intervals, a direct current ignition system including an induction coil, and means to cause said induction coil to evolve a spark of substantially the same intensity for each cylinder.

29. In an internal combustion engine of a type in which the firing order proceeds at irregular intervals, a direct current ignition system including an interrupter cam, said cam having a plurality of circuit closing conformations of uniform length, adjoining the circuit opening conformations of non-uniform length.

In testimony whereof we affix our signatures.

WILLIAM A. CHRYST.
JOHN H. HUNT.

Witnesses:
J. W. McDONALD,
IRVIN A. GREENWALD.